(12) United States Patent
Lu et al.

(10) Patent No.: US 12,256,298 B2
(45) Date of Patent: Mar. 18, 2025

(54) SERVICE INSTANCE INDICATION FOR RESOURCE CREATION

(71) Applicant: TELEFONAKTIEBOLAGET LM ERICSSON (PUBL), Stockholm (SE)

(72) Inventors: Yunjie Lu, Shanghai (CN); Yong Yang, Kållered (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 659 days.

(21) Appl. No.: 17/293,529

(22) PCT Filed: Jun. 18, 2019

(86) PCT No.: PCT/IB2019/055117
§ 371 (c)(1),
(2) Date: May 13, 2021

(87) PCT Pub. No.: WO2020/099943
PCT Pub. Date: May 22, 2020

(65) Prior Publication Data
US 2022/0124468 A1    Apr. 21, 2022

(30) Foreign Application Priority Data
Nov. 15, 2018   (WO) ................ PCT/CN2018/115618

(51) Int. Cl.
*H04W 4/50*      (2018.01)
*H04L 67/1004*   (2022.01)
(Continued)

(52) U.S. Cl.
CPC ........... *H04W 4/50* (2018.02); *H04L 67/1004* (2013.01); *H04L 67/51* (2022.05); *H04L 67/60* (2022.05)

(58) Field of Classification Search
CPC ......... H04W 4/50; H04W 76/11; H04L 67/16; H04L 67/28; H04L 67/32; H04L 67/51; H04L 67/60; H04L 67/1004
See application file for complete search history.

(56) References Cited

U.S. PATENT DOCUMENTS 10,963,553 B2 * 3/2021 Bykampadi ......... H04L 63/0884
11,509,728 B2 * 11/2022 Landais ................ H04L 69/322
(Continued)

OTHER PUBLICATIONS

3GPP "3rd Generation Partnership Project; Technical Specification Group Core Network and Terminals; 5G System; Restoration Procedures (Release 15)", TS 23.527 V15.1.0, Dec. 2018.
(Continued)

*Primary Examiner* — Khawar Iqbal
(74) *Attorney, Agent, or Firm* — Sonoda & Kobayashi Intellectual Property Law; Sarvajit S. Patil

(57) ABSTRACT

A method of operation of a network node implementing a network function, NF, service producer in a core network for providing accurate information related to the selected service instance in the NF service producer and to allow the NF service consumer, when detecting a restart of the service instance, to perform end user service restoration (e.g. restoring UE IP connectivity), and/or to clean up the resource is provided. The method comprises receiving at the NF service producer a request to create or update a resource via for example HTTP/REST signaling, the NF service producer selecting a service instance, where the resource is replicated, to create or update the requested resource and sending a response to the received request comprising a resource Uniform Resource Identifier, URI, of the created or updated resource by the second service instance and a service instance identifier identifying the selected service instance.

17 Claims, 9 Drawing Sheets

(51) Int. Cl.
  *H04L 67/51* (2022.01)
  *H04L 67/60* (2022.01)
  *H04W 76/11* (2018.01)

(56) References Cited

U.S. PATENT DOCUMENTS

| | | | | |
|---|---|---|---|---|
| 11,689,669 | B2* | 6/2023 | Saker | H04M 15/8027 |
| | | | | 455/406 |
| 2009/0112870 | A1* | 4/2009 | Ozzie | G06F 16/184 |
| | | | | 707/999.009 |
| 2018/0063258 | A1* | 3/2018 | Wang | H04L 65/613 |
| 2019/0251241 | A1* | 8/2019 | Bykampadi | H04W 12/009 |
| 2019/0356558 | A1* | 11/2019 | Han | H04L 41/14 |
| 2020/0007632 | A1* | 1/2020 | Landais | H04L 67/02 |
| 2020/0137182 | A1* | 4/2020 | Zong | H04W 8/26 |
| 2021/0168055 | A1* | 6/2021 | Lair | H04L 41/0813 |
| 2021/0234966 | A1* | 7/2021 | Saker | H04M 15/64 |
| 2022/0225165 | A1* | 7/2022 | Park | H04W 28/06 |
| 2023/0105343 | A1* | 4/2023 | Lu | H04L 43/0817 |
| | | | | 455/414.1 |

OTHER PUBLICATIONS

3rd Generation Partnership Project, "3rd Generation Partnership Project; Technical Specification Group Services and System Aspects; Procedures for the 5G System; Stage 2 (Release 15)", Technical Specification, 3GPP TS 23.502 V15.3.0, pp. 1-330, Sep. 2018, 3GPP, France.

3rd Generation Partnership Project, "3rd Generation Partnership Project; Technical Specification Group Services and System Aspects; System Architecture for the 5G System; Stage 2 (Release 15)", Technical Specification, 3GPP TS 23.501 V15.3.0, pp. 1-226, Sep. 2018, 3GPP, France.

3rd Generation Partnership Project; Technical Specification Group Core Network and Terminals; 5G System; Technical Realization of Service Based Architecture; Stage 3, (Release 15), 3GPP TS 29.500 V1.1.0, Apr. 2018.

International Search Report and Written Opinion issued on applicant's corresponding PCT application PCT/IB2019/055117 pp. 1-15.

* cited by examiner

SERVICE INSTANCE INDICATION FOR RESOURCE CREATION

RELATED APPLICATION

This application claims the benefit of provisional patent application serial number PCT/CN2018/115618, filed Nov. 15, 2018, the disclosure of which is hereby incorporated herein by reference in its entirety.

TECHNICAL FIELD

5G Architecture, Service instance and Resource Creation.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Third Generation Partnership Project (3GPP) is working on Fifth Generation (5G), and its associated core network that provides services to the connecting users, from authentication to Internet Protocol (IP) address assignment and routing of packets. However, the 5G core network, 5G, is significantly different from previous generations.

In 3GPP 5GC, the communication between the control plane entities is service based, using HTTP Restful API. A cloud native implementation for 5GC network entities is trend of the industry, e.g. using container system to build separate micro services to support each of 3GPP Network Function, NF services. The 3GPP 5GC service-based architecture, SBA, is illustrated in FIG. 2A (Prior art).

3GPP is also specifying Restoration procedures in the 5GC. 3GPP is describing the restoration procedures in a Technical Specification, TS 23.527 version 15.0.0 that describes how an NF of the SBA detects a restart of a peer NF. The TS states at clause 6.1 that a NF may detect a failure or a restart of a peer NF or NF service using the NRF as illustrated in FIG. 2B (prior art). Or, an NF may also detect a restart of a peer NF or NF service by receiving recovery time information in signalling exchanged with that peer NF or NF service. At the 3GPP CT4 meeting of October $15^{th}$-$19^{th}$ of October, it was agreed to pass Recovery Time stamp of a service producer in a HTTP response message as per the following Change Request, CR, available at http://www.3gpp.org/ftp/tsg_ct/WG4_protocollars_ex-CN4/TSGCT4_86bis_Vilnus/Docs/C4-187420.zip In the CR it was also agreed that the recovery timestamp signalled in direct signalling between NFs shall be associated to a NF service instance, i.e. the same recovery timestamp shall be signalled by a NF service instance whatever the NF service instance's endpoint addresses used for the signalling.

SUMMARY

Few challenges exist with the existing restoration procedure. Notably, in 3GPP 5GC, when a network function, NF, named NF A successfully created a resource via a service instance on another NF, named NF B, NF A should associate the created resource with the service instance. NF A should use the association to detect restart of the service instance to take appropriate restoration or clean-up actions and apply load/overload control functionalities.

When a service instance (e.g. Service Instance 1) in NF B receives the request to create a resource, it is possible that it selects another NF service instance (e.g. Service Instance 2) providing the same service and requests the selected one to create the resource and handle subsequent service operations on that resource. In this case, NF A should be aware that the created resource should be associated with selected service instance (i.e. Service Instance 2), instead of the one provided in the Resource creation request.

In addition, when NF A updates the resource in subsequent service operations, the hosting service instance may transfer the resource to another service instance, e.g. during overload control procedure. NF A should also be aware of this change and perform the necessary update on the association. Note that the resource URI returned in the response cannot and shouldn't be used to identify the service instance. e.g. the resource may be exposed via an IP address other than any IP end-points of the hosting service instance.

To mitigate the above challenges, method and corresponding apparatus are provided wherein:

An NF acting as a service producer receives a request from an NF acting as a service consumer to create or update a resource at an NF producer, The NF service producer selects a service instance and provides in its response to the NF service consumer a Uniform Resource Identifier, URI, for the created or updated resource and information associated with the selected service instance. The information comprises for example the identifier of the selected service instance or the information associated with the selected service instance may further comprise a recovery time of the selected service instance or may even further comprise information related to at least an overload information and a load information of the requested service instance and/or the selected service instance.

For example, receiving a request by the NF service producer to create or update the resource further comprises receiving an identifier of a requested service instance, in which case for example, the selected service instance is different from the requested service instance in the Resource request.

The identifier of the service instance identifies a unit of an NF which is a piece of software and/or hardware that provides an NF service;

The information associated with the selected service instance identification comprises at least a recovery time stamp, an overload information, and a load information.

The NF acting as a service consumer, when it receives a selected service instance by the NF service producer associates the resource with the selected service instance of the NF service producer.

For example, the selected service instance by the NF service producer is on the same or another also NF acting as a service producer for the same service.

The request and response messages may for example be based on hypertext transport protocol/REpresentational State Transfer, HTTP/REST.

The examples provided herein would help provide accurate information related to a service instance in the NF service producer, e.g. recovery time stamp, to allow the service consumer, when detecting a restart of the service instance, to perform end user service restoration (e.g. restoring UE IP connectivity), and/or to clean up the resource if necessary.

If such specific information is related to an overload information, the service consumer could perform overload control, e.g. throttle service requests towards the service instance within a certain period, according to configuration.

An example of a network node or entity implementing a network function, NF, service producer in a core network adapted to perform any of the method examples presented herein.

Another example describes a network node implementing a network function, NF, service producer in a core network comprising one or more processors; and memory comprising instructions executable by the one or more processors whereby the network node is adapted to perform any of the method examples presented herein.

Another example describes a network node implementing a network function, NF, service producer in a core network, comprising one or more modules operable to perform any of the method examples presented herein.

Another example of a method of operation of a network node implementing a network function, NF, service consumer in a core network, is provided. The method comprises the steps of sending to a first service instance of an NF service producer a request message to create or update a resource; receiving a response message comprising a Uniform Resource Identifier, URI, of the created or updated resource at a second service instance and a service instance identifier identifying the second service instance. The first and the second service instance may be different service instances with different identifiers. The response message may further comprise overload or load information associated to either the first or the second service instance or both.

In one example, the method further comprises sending subsequent resource related messages to the second service instance provided by the NF service producer in the response message.

An example of a network node/entity or entity implementing a network function, NF, service consumer in a core network is provided. The network node/entity is adapted to perform any of the method examples described herein at the NF service consumer.

Another example of a network node or entity implementing a network function, NF, service consumer in a core network is provided. The network node/entity comprises one or more processors and memory comprising instructions executable by the one or more processors whereby the network node is adapted to perform any of the method examples described herein at the NF service consumer.

Another example of a network node implementing a network function, NF, service consumer in a core network is provided. The network node comprises one or more modules operable to perform any of the method examples described herein at the NF service consumer.

For example, the NF service producer is a Session Management function of the 3GPP 5G Core network and the NF Service consumer is an Access Management Function, AMF, of the 3GPP 5G Core network.

This summary is not an extensive overview of all contemplated implementation examples and is not intended to identify key or critical aspects or features of any or all implementation or to delineate the scope of any or all the implementation examples presented herein. In that sense, other aspects and features will become apparent to those ordinarily skilled in the art upon review of the following description of specific implementation examples in conjunction with the accompanying figures.

BRIEF DESCRIPTION OF THE DRAWINGS

The accompanying drawing figures incorporated in and forming a part of this specification illustrate several aspects of the disclosure, and together with the description serves to explain the principles of the disclosure.

DESCRIPTION

In context of SBA and the present disclosure some definitions are useful:

Service Producer: An entity offering one or more services.

Service consumer: An entity consuming a service.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 1:
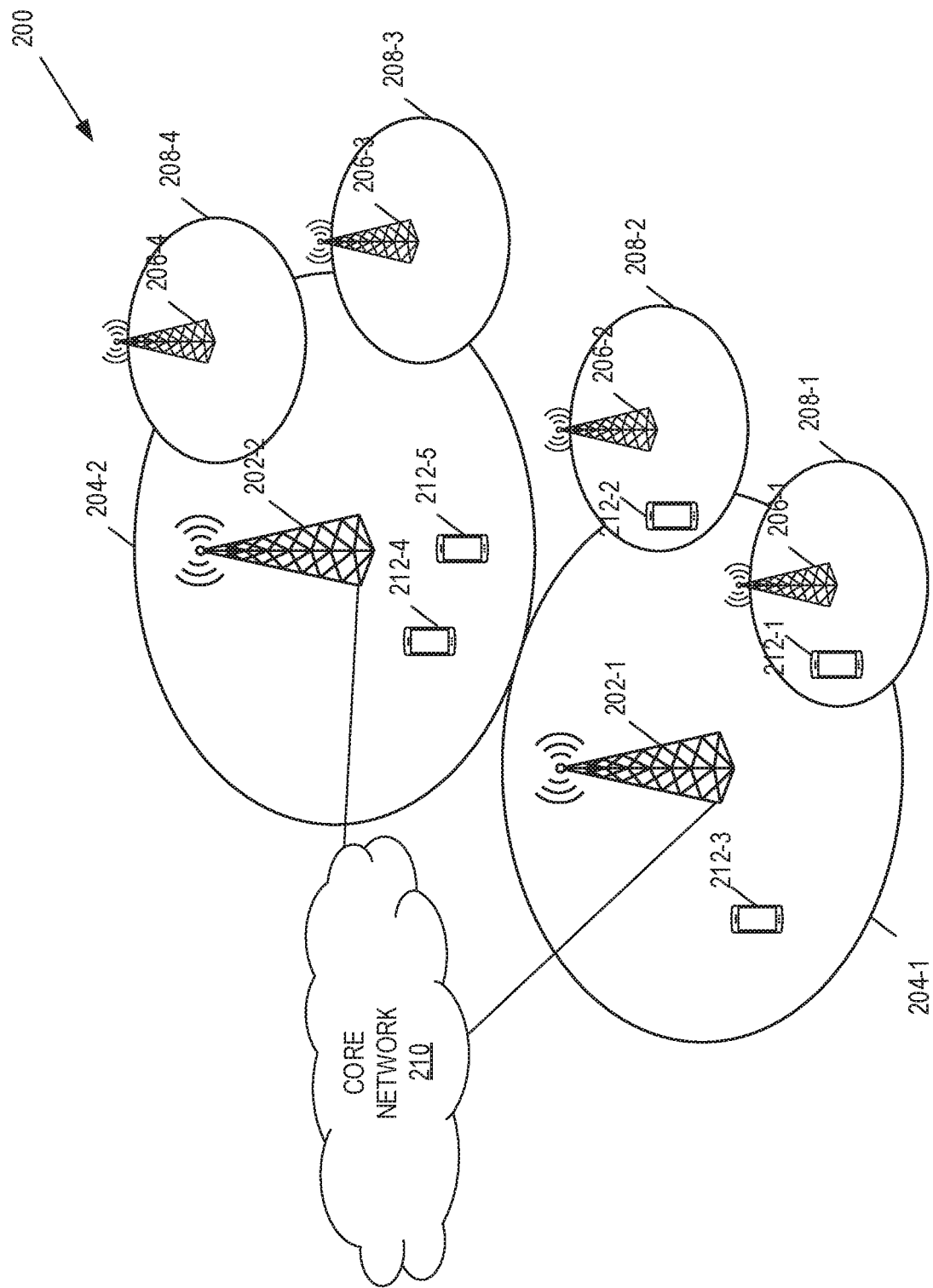
FIG. 1 illustrates an example of a telecommunication system.

FIG. 1 illustrates one example of a cellular communications network 200 according to some embodiments of the present disclosure. In the embodiments described herein, the cellular communications network 200 is a 5G NR network. In this example, the cellular communications network 200 includes base stations 202-1 and 202-2, which in LTE are referred to as eNBs and in 5G NR are referred to as gNBs, controlling corresponding macro cells 204-1 and 204-2. The base stations 202-1 and 202-2 are generally referred to herein collectively as base stations 202 and individually as base station 202. Likewise, the macro cells 204-1 and 204-2 are generally referred to herein collectively as macro cells 204 and individually as macro cell 204. The cellular communications network 200 may also include a number of low power nodes 206-1 through 206-4 controlling corresponding small cells 208-1 through 208-4. The low power nodes 206-1 through 206-4 can be small base stations (such as pico or femto base stations) or Remote Radio Heads (RRHs), or the like. Notably, while not illustrated, one or more of the small cells 208-1 through 208-4 may alternatively be provided by the base stations 202. The low power nodes 206-1 through 206-4 are generally referred to herein collectively as low power nodes 206 and individually as low power node 206. Likewise, the small cells 208-1 through 208-4 are generally referred to herein collectively as small cells 208 and individually as small cell 208. The base stations 202 (and optionally the low power nodes 206) are connected to a core network 210.

The base stations 202 and the low power nodes 206 provide service to wireless devices 212-1 through 212-5 in the corresponding cells 204 and 208. The wireless devices 212-1 through 212-5 are generally referred to herein collectively as wireless devices 212 and individually as wireless device 212. The wireless devices 212 are also sometimes referred to herein as UEs.

Figure 2A:
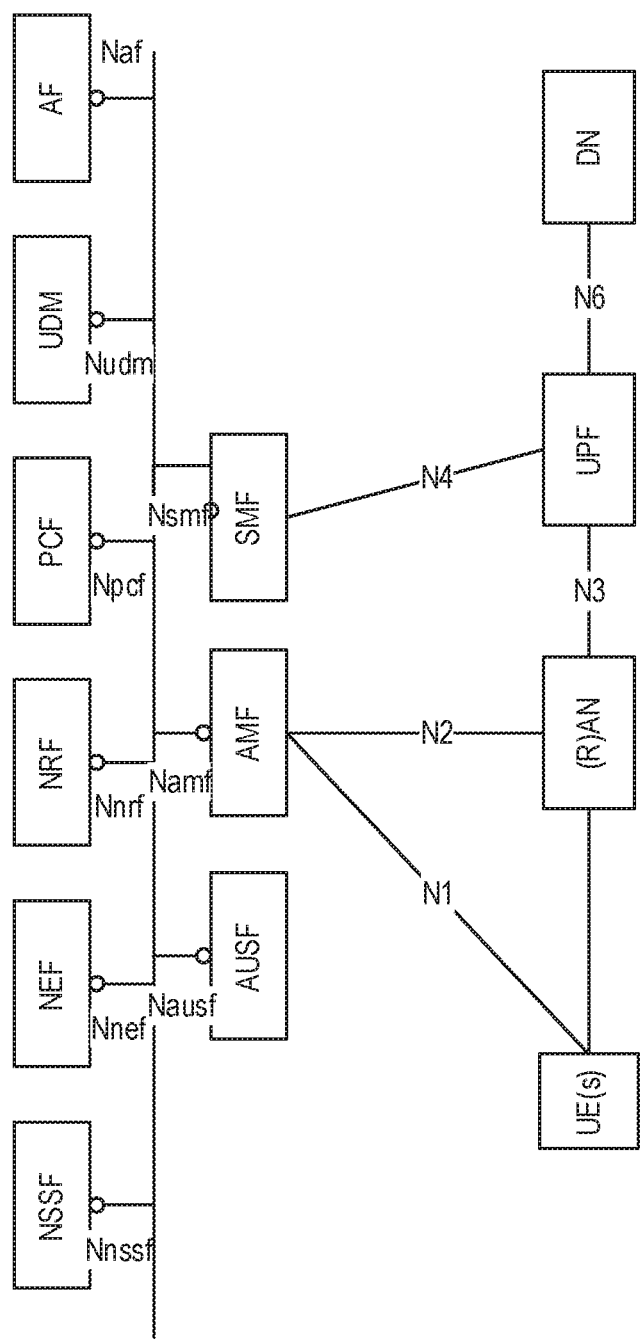
FIG. 2A (prior art) illustrates a 5GC SBA architecture as specified in 3GPP TS 23.501.
Figure 2B:
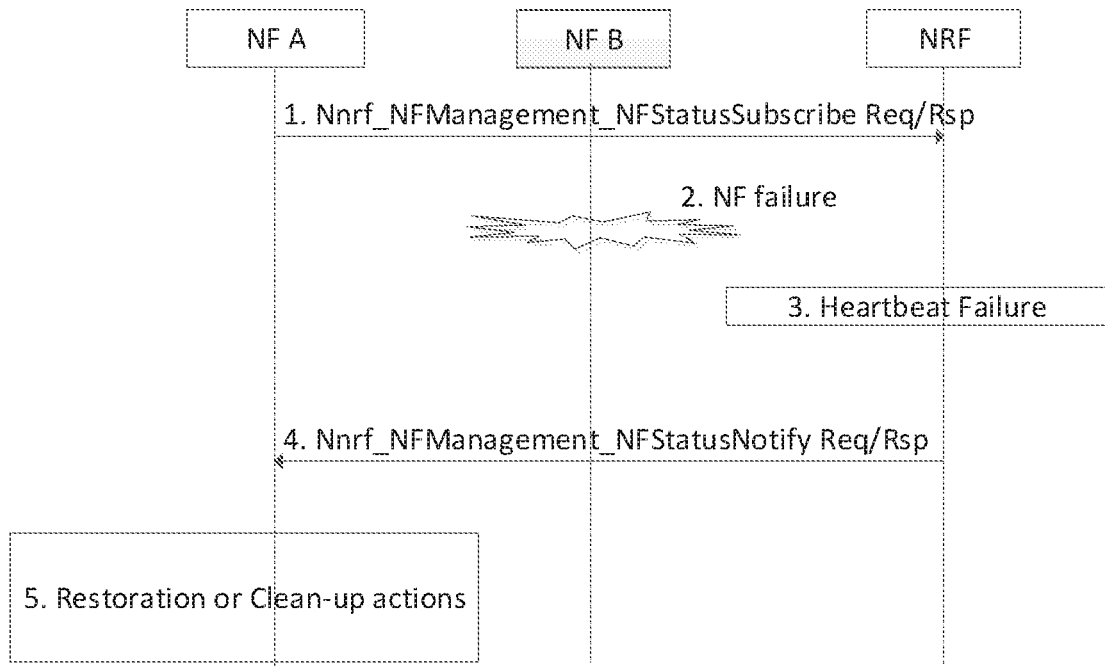
FIG. 2B (prior art) illustrates a NF service consumer detecting a restart in the NF service producer.

FIG. 2A illustrates a 5G network architecture using service-based interfaces between the NFs in the control plane. Seen from the access side the 5G network architecture shown in FIG. 2A comprises a plurality of User Equipment (UEs) connected to either a Radio Access Network (RAN) or an Access Network (AN) as well as an Access and Mobility Management Function (AMF). Typically, the R(AN) comprises base stations, e.g. such as evolved Node Bs (eNBs) or 5G base stations (gNBs) or similar. Seen from the core network side, the 5G core NFs shown in FIG. 2A include a Network Slice Selection Function (NSSF), an Authentication Server Function (AUSF), a Unified Data Management (UDM), an AMF, a Session Management Function (SMF), a Policy Control Function (PCF), and an Application Function (AF). The service(s) etc. that a NF provides to other authorized NFs can be exposed to the authorized NFs through the service-based interface. In FIG. 2A, the service based interfaces are indicated by the letter "N" followed by the name of the NF, e.g. Namf for the service based interface of the AMF and Nsmf for the service based interface of the SMF etc.

Some properties of the NFs shown in FIG. 2A may be described in the following manner. The AMF provides UE-based authentication, authorization, mobility management, etc. A UE even using multiple access technologies is basically connected to a single AMF because the AMF is independent of the access technologies. The SMF is responsible for session management and allocates Internet Protocol (IP) addresses to UEs. It also selects and controls the UPF for data transfer. If a UE has multiple sessions, different SMFs may be allocated to each session to manage them individually and possibly provide different functionalities per session. The AF provides information on the packet flow to the PCF responsible for policy control in order to support Quality of Service (QoS). Based on the information, the PCF determines policies about mobility and session management to make the AMF and SMF operate properly. The AUSF supports authentication function for UEs or similar and thus stores data for authentication of UEs or similar while the UDM stores subscription data of the UE. The Data Network (DN), not part of the 5G core network, provides Internet access or operator services and similar.

An NF may be implemented either as a network element on a dedicated hardware, as a software instance running on a dedicated hardware, or as a virtualized function instantiated on an appropriate platform, e.g., a cloud infrastructure.

As previously described in the summary, with the current agreed solution in 3GPP TS 23.527 and the contribution C4-187420, the expected behavior to detect restart of peer service instance is by using recoveryTime attribute in Request/response, and take appropriate restoration or clean-up actions accordingly. However, in for example SMF with distributed collection scenario, the mechanism may not work properly.

In such a scenario, the SMF service instance received the request to create a PDU session (context) resource and may select another service instance to really create the resource. It is therefore proposed according to the embodiments herein to return the resource URI in for example the Location header of the response message to the service consumer. Subsequent operations on the created resource will go to the selected service instance, thus the resource should be associated with the selected service instance which is hosting the resource.

In accordance with some embodiment herein the service instance Id of the hosting SMF service instance should be provided in create and/or update service operations. This would result that the NF consumer can associate the resource with the correct service instance and implement the P2P restoration procedures.

Figure 3:
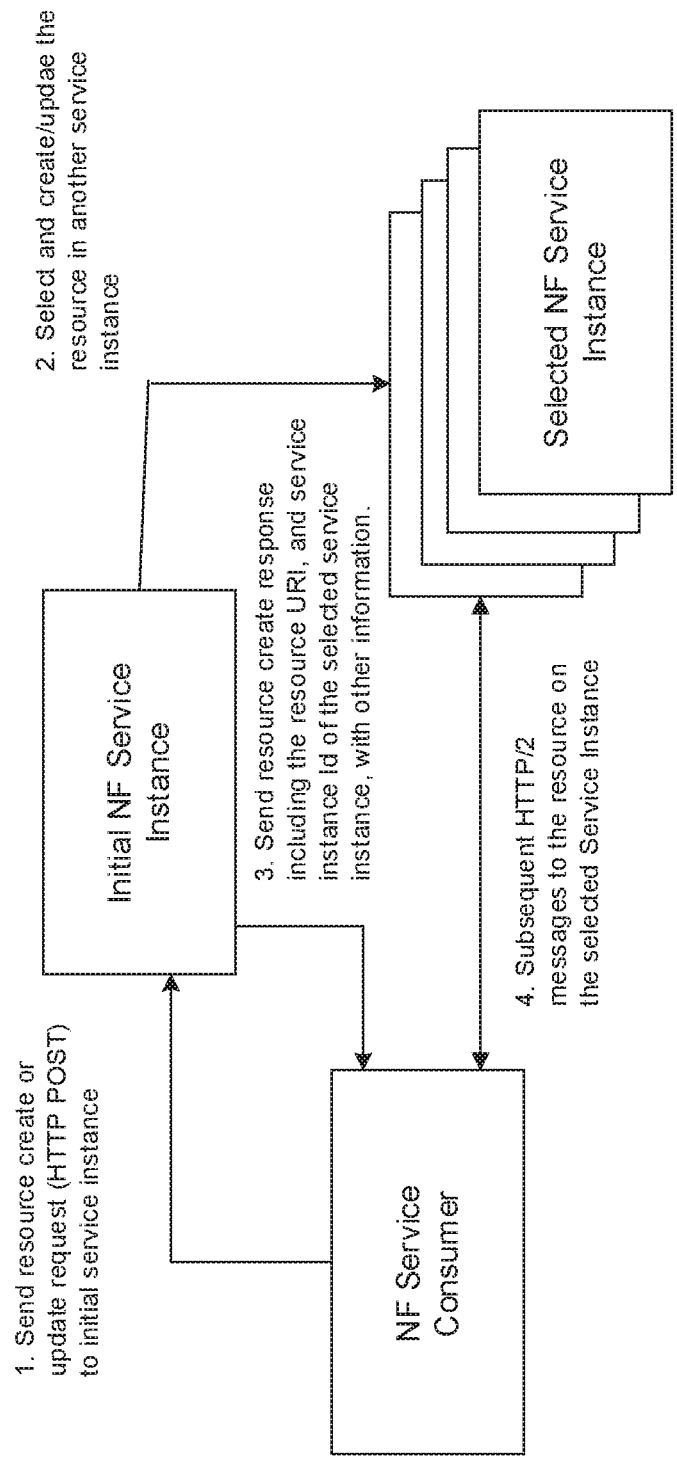
FIG. 3 illustrates a service instance selection and assignment for creation or updating of a resource showing the method steps executed at the NF service producer and consumer in accordance with some embodiment.

FIG. 3 illustrates a deployment topology in accordance with an embodiment. An NF service instance, which is referred to a first service instance, can provide an Application Programming Interface Uniform Resource Identifier, API URI, root which is used by the NF service consumer for initiating the creation of resources or a resource URI which is used by the NF service consumer to update the resource, as shown in FIG. 3, step 1. When the requested resource is replicated in a second service instance, the HTTP/2 messages from the NF service consumer for the creation/update of resources at the NF service producer, is created on or transferred to the second (or other) service instance, as shown in FIG. 3, Step 2. The second service instance may be in the same network function or in a different NF providing the same service. Information such as the resource URI and service instance identification of the second (or other) service instance is included in the response to the NF Service Consumer, as illustrated in step 3 of FIG. 3. Other associated information may be included in the message at step 3, such as recovery time or load information associated to the first service instance and/or the second service instance. The NF service consumer updates the association and maintains subsequent interactions with the resource in the new selected (second or other) service instance as shown in step 4 of FIG. 3.

In one embodiment, the service instance identification is provided in the 3GPP SMContextCreatedData and PDuSessionCreatedData types as well as the OpenAPI that are described in 3GPP TS 29.502. The attribute that supports the embodiment of FIG. 3 is exemplified below (new attribute in bold and underlined):

SMContextCreatedData

TABLE 6.1.6.2.3-1

Definition of type SmContextCreatedData

| Attribute name | Data type | P | Cardinality | Description |
|---|---|---|---|---|
| hsmfUri | Uri | C | 0 ... 1 | This IE shall be present in HR roaming scenarios if the additionalHsmfUri IE was received in the request and the V-SMF established the PDU session towards an alternative SMF listed in the additionalHsmfUri IE. When present, it shall contain the URI of the H-SMF towards which the PDU session was established. |
| pduSessionId | PduSessionId | C | 0 ... 1 | This IE shall be present, during an EPS to 5GS Idle mode mobility or handover using the N26 interface. When present, it shall be set to the PDU Session ID. |
| sNssai | Snssai | C | 0 ... 1 | This IE shall be present during an EPS to 5GS Idle mode mobility or handover using the N26 interface. When present, it shall contain the S-NSSAI assigned to the PDU session. |
| upCnxState | UpCnxState | C | 0 ... 1 | This IE shall be present if the SMF was requested to activate the user plane connection of the PDU session in the corresponding request. When present, it shall be set as specified in subclause 5.2.2.2.2. |
| n2SmInfo | RefToBinaryData | C | 0 ... 1 | This IE shall be present if N2 SM Information needs to be sent to the AN. |
| n2SmInfoType | N2SmInfoType | C | 0 ... 1 | This IE shall be present if "n2SmInfo" attribute is present. When present, this IE shall indicate the NG AP IE type for the NG AP SMF related IE container carried in "n2SmInfo" attribute. |
| allocatedEbiList | array(EbiArpmapping) | C | 0 ... N | This IE shall be present if the consumer NF is an AMF and Inter-system mobility happens. When present, it shall contain an array of EBI to ARP mappings currently allocated to the PDU session. |
| hoState | HoState | C | 0 ... 1 | This IE shall be present if the SMF was requested to prepare an EPS to 5GS handover for the PDU session in the corresponding request. When present, it shall be set as specified in subclause 5.2.2.2.3. |
| smfServiceInstanceId | string | O | 0 ... 1 | When present, this IE shall contain the serviceInstanceId of the SMF service instance serving the PDU session Context. This IE may be used by the AMF to identify PDU session contexts affected by a failure or restart of the SMF service instance (see subclause 6.2 of 3GPP TS 23.527 [24]). |
| supportedFeatures | SupportedFeatures | C | 0 ... 1 | This IE shall be present if at least one optional feature defined in subclause 6.1.8 is supported. |

PduSessionCreatedData

TABLE 6.1.6.2.10-1

Definition of type PduSessionCreatedData

| Attribute name | Data type | P | Cardinality | Description |
|---|---|---|---|---|
| pduSessionType | PduSessionType | M | 1 | This IE shall indicate the selected PDU type. |
| sscMode | string | M | 1 | This IE shall indicate the SSC mode applicable to the PDU session. When present, it shall be encoded as one character in hexadecimal representation, taking a value of "0" to "9" or "A" to "F", representing the 4 bits of the SSC mode value of the SSC mode IE specified in subclause 9.8.4.10 of 3GPP TS 24.501 [7]. Example: SSC mode 3 shall be encoded as "3". See NOTE. |
| hcnTunnelInfo | TunnelInfo | M | 1 | This IE shall contain the N9 tunnel information on the home CN side. |
| sessionAmbr | Ambr | M | 1 | This IE shall contain the Session AMBR granted to the PDU session. |
| qosFlowsSetupList | array(QosFlowSetupItem) | M | 1 ... N | This IE shall contain the set of QoS flow(s) to establish for the PDU session. It shall contain at least the Qos flow associated to the default Qos rule. |

TABLE 6.1.6.2.10-1-continued

Definition of type PduSessionCreatedData

| Attribute name | Data type | P | Cardinality | Description |
|---|---|---|---|---|
| pduSessionId | PduSessionId | C | 0 . . . 1 | This IE shall be present during an EPS to 5GS Idle mode mobility or handover preparation using the N26 interface. When present, it shall be set to the PDU Session ID. |
| sNssai | Snssai | C | 0 . . . 1 | This IE shall be present during an EPS to 5GS Idle mode mobility or handover using the N26 interface. When present, it shall contain the S-NSSAI assigned to the PDU session in the Home PLMN. |
| enablePauseCharging | boolean | C | 0 . . . 1 | This IE shall be present, based on operator's policy, to enable the use of Pause of Charging for the PDU session (see subclause 4.4.4 of 3GPP TS 23.502 [3]). When present, it shall be set as follows: true: enable Pause of Charging; false (default): disable Pause of Charging. |
| ueIpv4Address | Ipv4Addr | C | 0 . . . 1 | This IE shall be present if the H-SMF assigns a UE IPv4 address to the PDU session. |
| ueIpv6Prefix | Ipv6Prefix | C | 0 . . . 1 | This IE shall be present if the H-SMF assigns a UE IPv6 prefix to the PDU session. |
| n1SmInfoToUe | RefToBinaryData | C | 0 . . . 1 | This IE shall be present if the H-SMF needs to send N1 SM information to the UE that does not need to be interpreted by the V-SMF. When present, this IE shall reference the n1SmInfoToUe binary data (see subclause 6.1.6.4.4). |
| epsPdnCnxInfo | EpsPdnCnxInfo | C | 0 . . . 1 | This IE shall be present if the PDU session may be moved to EPS during its lifetime. |
| epsBearerInfo | array(EpsBearerInfo) | C | 1 . . . N | This IE shall be present if the PDU session may be moved to EPS during its lifetime. |
| supportedFeatures | SupportedFeatures | C | 0 . . . 1 | This IE shall be present if at least one optional feature defined in subclause 6.1.8 is supported. |
| upSecurity | UpSecurity | O | 0 . . . 1 | When present, this IE shall indicate the security policy for integrity protection and encryption for the user plane of the PDU session. |
| hSmfServiceInstanceId | string | O | 0 . . . 1 | When present, this IE shall contain the serviceInstanceId of the H-SMF service instance serving the PDU session. This IE may be used by the V-SMF to identify PDU sessions affected by a failure or restart of the H-SMF service (see subclause 6.2 of 3GPP TS 23.527 [24]). |

NOTE:
This IE contains information that the V-SMF only needs to transfer to the UE (without interpretation). It is sent as a separate IE rather than within the n1SmInfoToUE binary data because the Selected SSC mode IE is defined as a "V" IE (i.e. without a Type field) in the NAS PDU Session Establishment Accept message.

Furthermore, currently 3GPP TS 29.518 has specified that AMF shall notify a consumer for subscription Id change, when a new subscription has been created with new subscription id during inter-AMF mobility procedures.

The present state of the art describes that in the notification, the new subscriptionId together with the notifyCorrelationId (or subscriptionChangeCorrelationId when available) will be included to the consumer, so the consumer could learn which subscription has been changed. The subscriptionId is expected to be the resource identifier of the new subscription on the new AMF, which in fact cannot be directly used by the consumer to perform subsequent service operations, e.g. to update or unsubscribe the event subscription after inter-AMF mobility. The embodiment presented herein mitigate the problem by proposing to include the resource URI of the new subscription instead in the subscription change notification, thus the consumer could use it as expected. This is also illustrated in FIG. 3.

To further describe how the above problem can be mitigated, an embodiment describing replacing the currently defined 3GPP "SubscriptionId" data type with SubscriptionUri" data type in the AmfEventNotification and is proposed.

AmfEventNotification

TABLE 6.2.6.2.4-1

Definition of type AmfEventNotification

| Attribute name | Date type | P | Cardinality | Description |
|---|---|---|---|---|
| notifyCorrelationId | string | M | 1 | Indicates the notification correlation ID provided by the NF service consumer during event subscription. This parameter can be useful if the NF service consumer uses a common call-back URI for multiple subscriptions. |
| subscriptionUri | Uri | C | 0 . . . 1 | This IE shall be present, if the event notification is generated by the AMF due to a change of AMF. When present, this IE shall contain the URI to the |

TABLE 6.2.6.2.4-1-continued

Definition of type AmfEventNotification

| Attribute name | Date type | P | Cardinality | Description |
|---|---|---|---|---|
| reportList | array(AmfEventReport) | C | 1 . . . N | subscription resource created at the new AMF which replacing the original subscription on the old AMF. This IE shall be present if a event is reported. When present, this IE represents the event reports to be delivered. |

Figure 4:
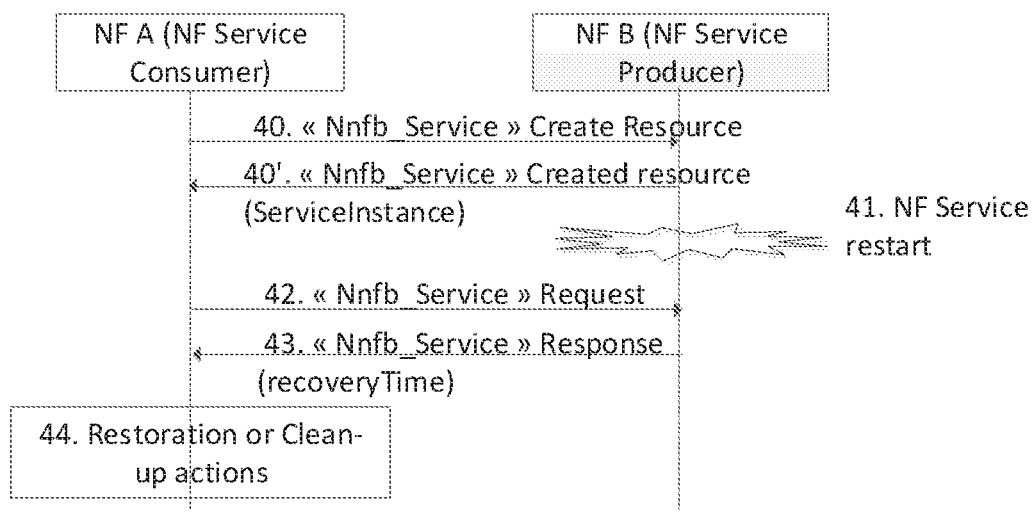
FIG. 4 illustrates a flow diagram for start detection and restoration in accordance with some embodiment.

FIG. 4 illustrates a NF Service restart scenario of an NF Service Producer and how the NF Service Consumer can detect this restart, according to some embodiments.

Step 40: NF A requests to create a resource in the NF B, and the NF B accepts the request. The NF A shall associate the created resource with the service instance in the NF B.

Step 41: A NF service produced by NF B restarts.

Steps 42-43: NF B service may include its last recovery timestamp in responses it sends to the NF Service Consumer, if the restart of the NF service resulted in losing contexts and e.g. if the NF service has restarted recently.

Step 44: NF A may consider that all the resources created in the NF B service instance before the NF B service recovery time as being lost. NF A triggers the appropriate restoration or clean-up actions.

The recovery timestamp signalled in direct signalling between NFs shall be associated to a NF service instance, i.e. the same recovery timestamp shall be signalled by a NF service instance whatever the NF service instance's endpoint addresses used for the signaling. The procedure illustrated in FIG. 4 is only supported by NF services that support signalling the recoveryTime attribute.

Figure 6:
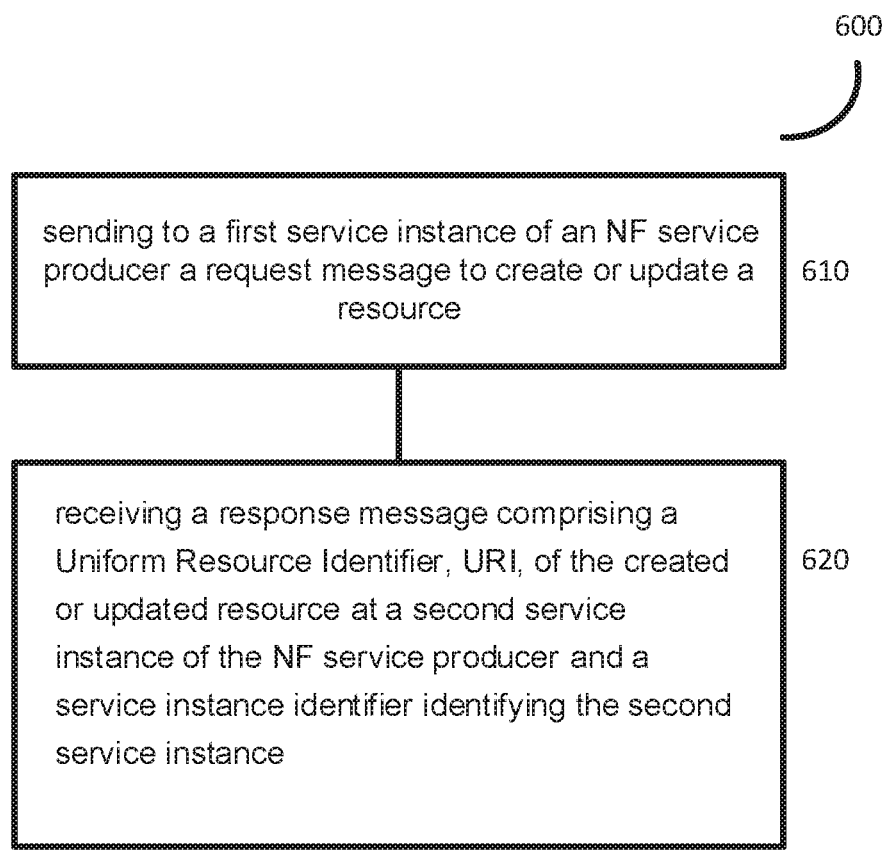
FIG. 6 illustrates a flow chart for a method in an NF service consumer according to some embodiments.

Note that the recovery time signalled is equivalent to the recovery time of the NF service of FIG. 6.2.3-2. For an entire NF restart scenario, this procedure can be applied by each NF service instance of the NF.

The procedure illustrated in FIG. 4 enables the detection of a restart of a peer NF service when sending signalling towards that NF Service. It can speed-up the detection of a restart of a peer NF service when frequent signalling occur towards that peer NF Service.

Figure 5:
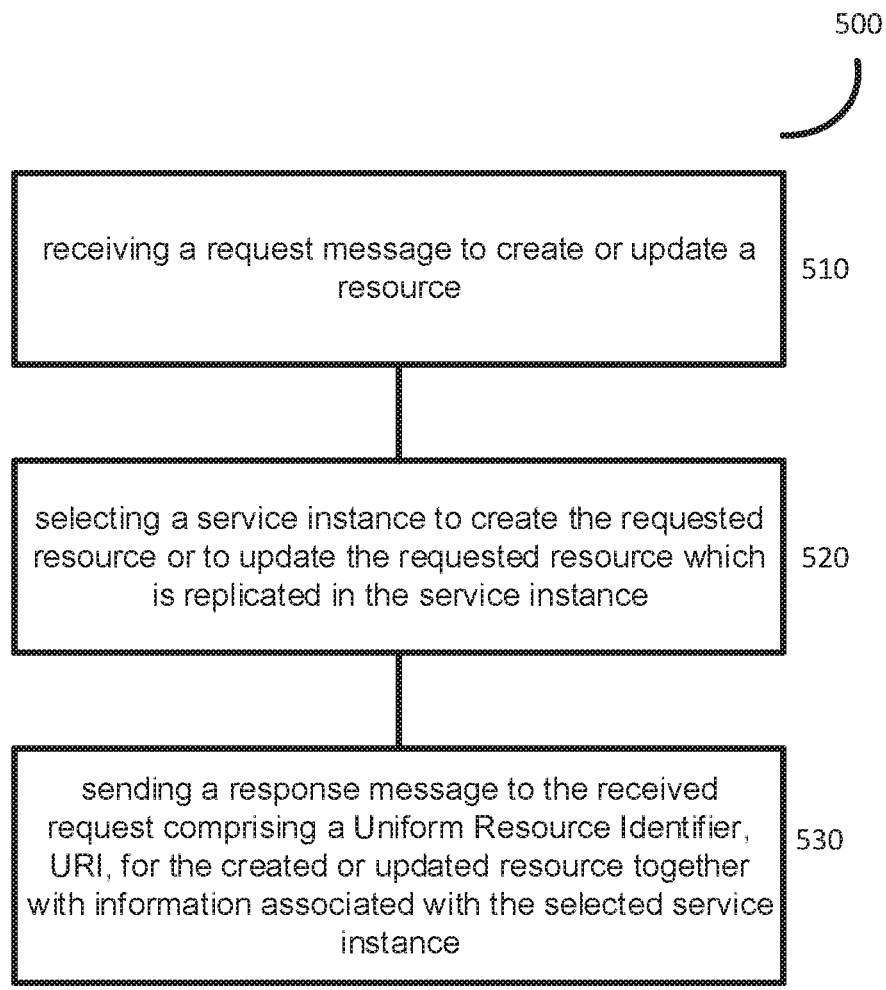
FIG. 5 illustrates a flow chart for a method in an NF service producer according to some embodiments.

FIG. 5 illustrates a method 500 executed at an NF service producer, such as an SMF of a 5G Core network in accordance with some embodiments. The method comprises the step 510 of receiving, at the NF service producer, a request message to create or update a resource and where the message is for example an hypertext transport protocol/REpresentational State Transfer HTTP/REST POST message or similar. The request message may also include an identifier of a service instance where the resource is to be created or updated. At step 520, the step of selecting a service instance at the NF service producer in order to create the requested resource or to update the requested resource is performed. This may be the case if for example the service instance in the request message (requested service instance) is restarted or failed. The resource is replicated in the selected service instance. The selected service instance may be different than the service instance included in the request message if one was included. In addition, the selected service instance may be on the same or another NF acting as a service producer for the same service.

At step 530, the step of sending, by the NF service producer, a response message to the received request from the NF service consumer and where the response message comprises a Uniform Resource Identifier, URI, for the created or updated resource together with information associated with the selected service instance and where the information comprises an identification of the selected service instance and may comprise a recovery time of the selected service instance (if restarted). Furthermore, the information further comprises information related to at least an overload information and a load information of the requested service instance and/or the selected service instance.

FIG. 6 illustrates a method 600 executed at an NF service consumer, such as an AMF of a 5G Core network in accordance with some embodiments. The method 600 comprises the step 610 of sending by the NF service consumer to an NF service producer a request message to create or update a resource indicating the service instance for the requested/updated resource. At step 620, the NF service consumer, receiving a message in response to the request message and where the response message comprises a Uniform Resource Identifier, URI, for the created or updated resource as well as an identifier of the service instance where the resource is created or updated at the NF service producer and where the identifier of the service instance included in the response message may be different from the service instance included in the request message. This may be the case in the event of a restart of the service instance included in the request message.

If the NF service consumer receives an identifier of a service instance for the requested/updated resource that is different from the service instance included in the request, the NF service consumer proceeds with associating the created or updated resource with the second service instance and sending subsequent resource related messages to the service instance identified by the NF service producer in the response message.

Additionally, the method 600 may, at step 620, further comprises receiving at the NF service consumer, perhaps within the same response message, information related to an overload information and/or a load information associated to the requested service instance included the request message and/or to the service instance selected by the NF service producer and included in the response message.

Figure 7:
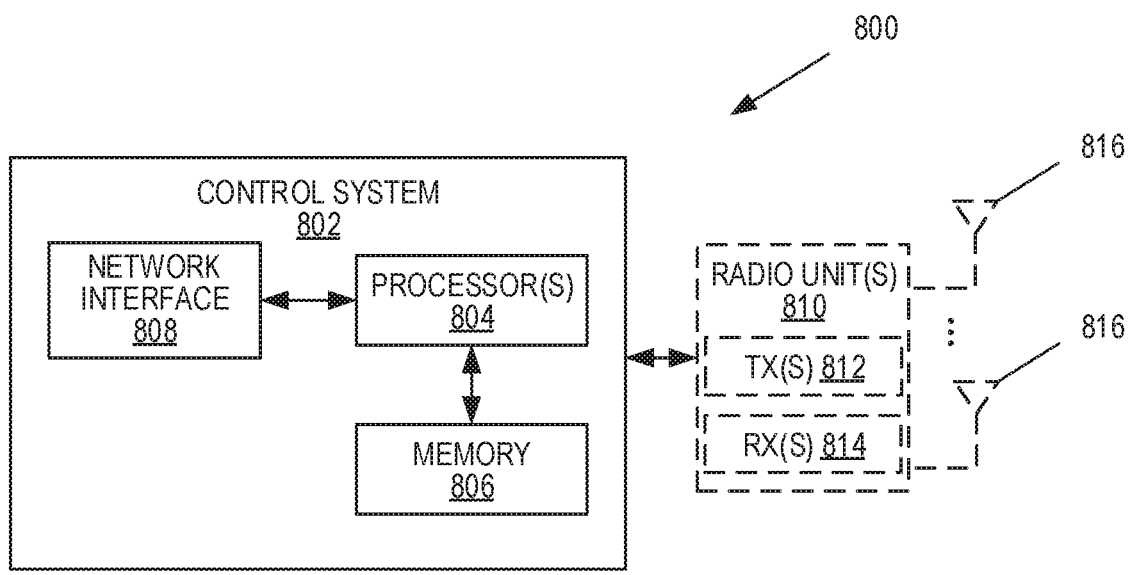
FIG. 7 illustrates a circuitry of a network node implementing the NF service producer/consumer according to an embodiment.

FIG. 7 is a schematic block diagram of a network node 800 according to some embodiments of the present disclosure. The network node may be a radio access node (e.g., a base station or other node in the radio access network) or a core network (e.g., a physical node that implements one or more core network NFs and/or core network services). As illustrated, the network node 800 includes a control system 802 that includes one or more processors 804 (e.g., Central Processing Units (CPUs), Application Specific Integrated Circuits (ASICs), Field Programmable Gate Arrays (FPGAs), and/or the like), memory 806, and a network interface

808. The one or more processors 804 are also referred to herein as processing circuitry.

In addition, in embodiments in which the network node 800 is a radio access node, the network node 800 includes one or more radio units 810 that each includes one or more transmitters 812 and one or more receivers 814 coupled to one or more antennas 816. The radio units 810 may be referred to or be part of radio interface circuitry. In some embodiments, the radio unit(s) 810 is external to the control system 802 and connected to the control system 802 via, e.g., a wired connection (e.g., an optical cable). However, in some other embodiments, the radio unit(s) 810 and potentially the antenna(s) 816 are integrated together with the control system 802.

The one or more processors 804 operate to provide one or more functions of a network node 800, and in particular the functions of a network function(s) or service(s), as described herein. In some embodiments, the function(s) are implemented in software that is stored, e.g., in the memory 806 and executed by the one or more processors 804.

Figure 8:
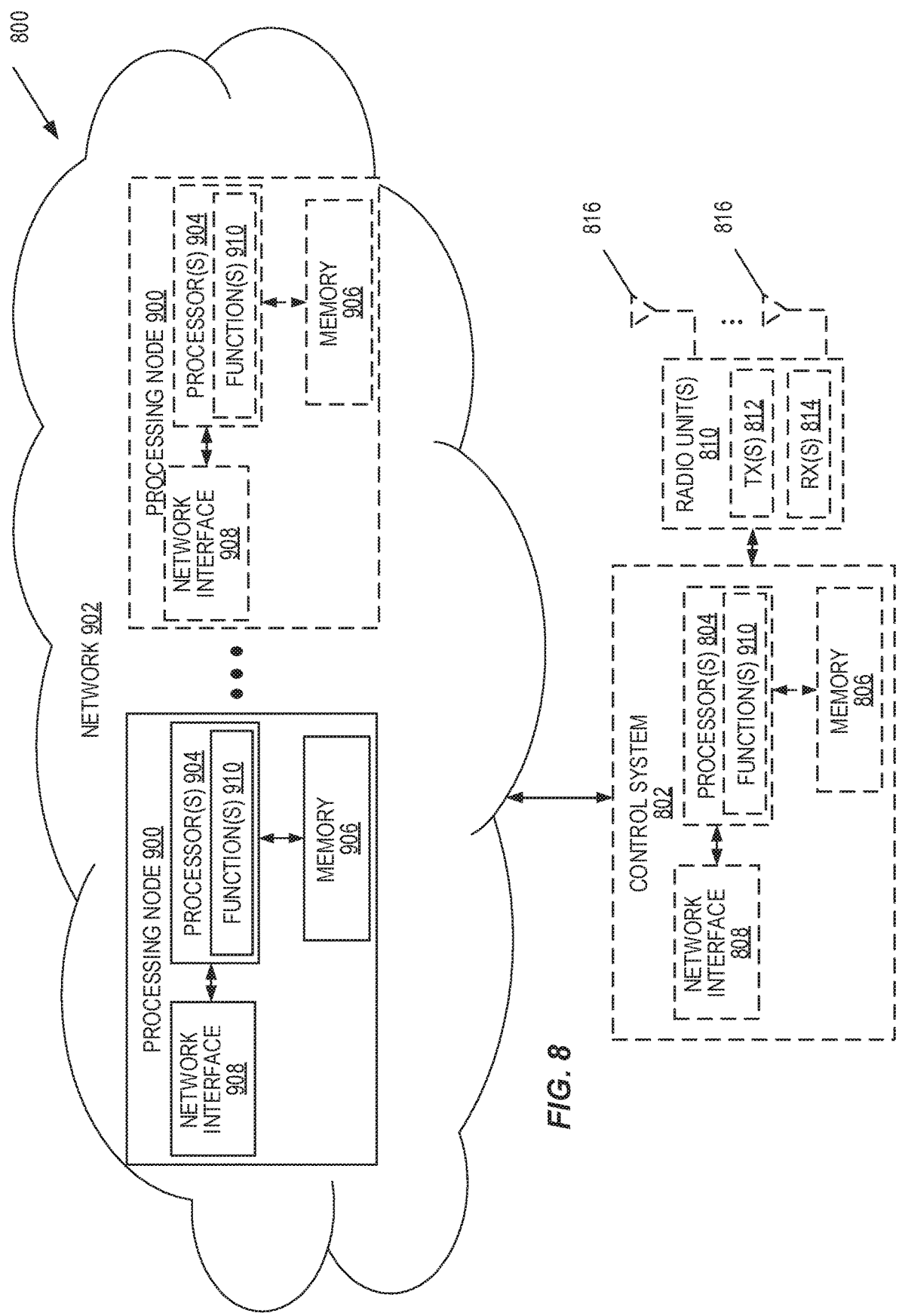
FIG. 8 illustrates a circuitry of a virtualized network node implementing the NF service producer/consumer, according to another embodiment.

FIG. 8 is a schematic block diagram that illustrates a virtualized embodiment of the network node 800 according to some embodiments of the present disclosure. This discussion is equally applicable to other types of network nodes. Further, other types of network nodes may have similar virtualized architectures.

As used herein, a "virtualized" network node is an implementation of the network node 800 in which at least a portion of the functionality of the network node 800 is implemented as a virtual component(s) (e.g., via a virtual machine(s) executing on a physical processing node(s) in a network(s)). As illustrated, in some embodiments, the network node 800 includes the control system 802 that includes the one or more processors 804 (e.g., CPUs, ASICs, FPGAs, and/or the like), the memory 806, and the network interface 808 and, if the network node 800 is a radio access node, the one or more radio units 810 that each includes the one or more transmitters 812 and the one or more receivers 814 coupled to the one or more antennas 816, as described above. The control system 802 is connected to one or more processing nodes 900 coupled to or included as part of a network(s) 902 via the network interface 808. Each processing node 900 includes one or more processors 904 (e.g., CPUs, ASICs, FPGAs, and/or the like), memory 906, and a network interface 908.

In this example, functions 910 of the network node 800 (e.g., functions of the network function(s) or service(s) implemented by the network node 800) described herein are implemented at the one or more processing nodes 900 or distributed across the control system 802 and the one or more processing nodes 900 in any desired manner. In some particular embodiments, some or all of the functions 910 of the network node 800 described herein are implemented as virtual components executed by one or more virtual machines implemented in a virtual environment(s) hosted by the processing node(s) 900. As will be appreciated by one of ordinary skill in the art, additional signaling or communication between the processing node(s) 900 and the control system 802 is used in order to carry out at least some of the desired functions 910.

In some embodiments, a computer program including instructions which, when executed by at least one processor, causes the at least one processor to carry out the functionality of network node 800 or a node (e.g., a processing node 900) implementing one or more of the functions 910 of the radio access node 800 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 9:
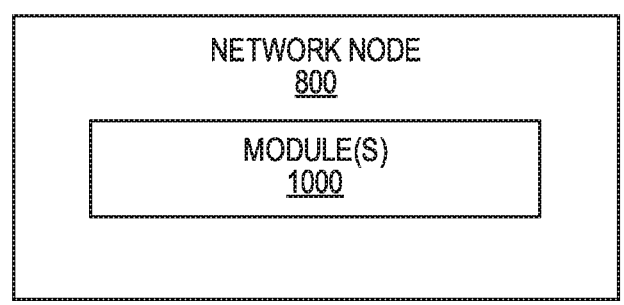
FIG. 9 illustrates a circuitry of a network node implementing the NF service producer/consumer according to an embodiment.

FIG. 9 is a schematic block diagram of the network node 800 according to some other embodiments of the present disclosure. The network node 800 includes one or more modules 1000, each of which is implemented in software. The module(s) 1000 provide the functionality of the network node 800 described herein. This discussion is equally applicable to the processing node 900 of FIG. 8 where the modules 1000 may be implemented at one of the processing nodes 900 or distributed across multiple processing nodes 900 and/or distributed across the processing node(s) 900 and the control system 802.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

EXAMPLE EMBODIMENTS

While not being limited thereto, some other example embodiments of the present disclosure are provided below. Note that these are merely examples and may not necessarily be the final claims.

1. A method of operation of a network node (800) implementing a network function, NF, service producer in a core network, the method comprising:
    receiving at a first service instance of the NF service producer in a request to create or update a resource via HTTP/REST signaling;
    selecting a second service instance to create requested resource or update the requested resource which is replicated in the second service instance; and
    sending a response to the received request comprising a resource Uniform Resource Identifier, URI, together with information associated with the second service instance.

2. The method of embodiment 1, wherein the second service instance is on the same or another network function, NF, which act as a service producer for a same service.

3. The method of embodiment 1, wherein the information further comprises an identification of the second service instance and an indication that a different service instance is returned in the response.

4. The method of embodiment 1 wherein the information further comprises a recovery time of the at least one of the first service instance or the second.

5. The method of embodiment 1 wherein the information further comprises information related at least an overload information and a load information of the first service instance and/or the second service instance.

6. A network node (800) implementing a network function, NF, service producer in a core network of a cellular communications system, adapted to perform the method of any one of embodiments 1 to 5.

7. A network node (800) implementing a network function, NF, service producer in a core network of a cellular communications system, comprising:
one or more processors; and
memory comprising instructions executable by the one or more processors whereby the network node is adapted to perform the method of any one of embodiments 1 to 5.

8. A network node (800) implementing a network function, NF, service producer in a core network of a cellular communications system, comprising:
one or more modules operable to perform the method of any one of embodiments 1 to 5.

9. A method of operation of a network node (800) implementing a network function, NF, service consumer in a core network of a cellular communications system, comprising:
sending to a first service instance of an NF service producer a request to create or update a resource via HTTP/REST signaling;
receiving a response comprising a resource Uniform Resource Identifier, URI, of the created or updated resource at a second service instance and a service instance identifier identifying the second service instance.

10. The method of embodiment 8 further comprising sending subsequent HTTP messages to the second service instance.

11. A network node (800) implementing a network function, NF, service consumer in a core network of a cellular communications system, adapted to perform the method of any one of embodiments 9 to 10.

12. A network node (800) implementing a network function, NF, service consumer in a core network of a cellular communications system, comprising:
one or more processors; and
memory comprising instructions executable by the one or more processors whereby the network node is adapted to perform the method of any one of embodiments 9 to 10.

13. A network node (800) implementing a network function, NF, service consumer in a core network of a cellular communications system, comprising:
one or more modules operable to perform the method of any one of embodiments 9 to 10.

ABBREVIATIONS

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
5G Fifth Generation
5GC Fifth Generation Core
AMF Access Management Function
API Application Program Interface
ASIC Application Specific Integrated Circuit
AUSF Authentication Service Function
CPU Central Processing Unit
CT Core Network and Terminals
DSP Digital Signal Processor
eNB Enhanced or Evolved Node B
FPGA Field Programmable Gate Array
gNB New Radio Base Station
HTTP Hypertext Transfer Protocol
LTE Long Term Evolution
NF Network Function
NR New Radio
RAM Random Access Memory
RAN Radio Access Network
REST Representational State Transfer
ROM Read Only Memory
RRH Remote Radio Head
SBA Service-Based Architecture
SMF Session Management Function
UDM User Data Manager
UDP User Datagram Protocol
UE User Equipment

The invention claimed is:

1. A method of operation of a network node implementing a network function, NF, service producer in a core network, the method comprising:
receiving at a first service instance of the NF service producer a request message from an NF service consumer to update a resource;
selecting a second service instance of an NF service producer different than the first service instance to update the requested resource which is replicated in the second service instance; and
sending a response message to the received request to the NF service consumer wherein the response message comprises a Uniform Resource Identifier, URI, for the updated resource together with information associated with the selected second service instance.

2. The method of claim 1, wherein the selected second service instance is on another NF acting as a service producer for a same service.

3. The method of claim 1, where in receiving a request to update a resource further comprises receiving an identifier of a requested service instance.

4. The method of claim 3 wherein the selected second service instance is different from the requested service instance.

5. The method of claim 1 wherein the request and response messages are based on hypertext transport protocol/REpresentational State Transfer, HTTP/REST.

6. The method of claim 1, wherein the information associated with the selected second service instance further comprises an identification of the selected second service instance.

7. The method of claim 1 wherein the information associated with the selected second service instance further comprises a recovery time of the selected second service instance.

8. The method of claim 1, wherein the information further comprises information related to at least an overload information and a load information of the requested service instance or the selected second service instance.

9. The method of claim 1, wherein the NF service producer of the first service instance and the NF service producer of the second service instance are each a Session Management Function, SMF, and the NF service consumer is an Access and Mobility Management Function, AMF, specified in the fifth generation Core network, 5GC.

10. The method of claim 1, wherein the requested resource is a PDU session context resource.

11. A network node implementing a network function, NF, service producer in a core network of a cellular communications system, comprising:
one or more processors; and
memory comprising instructions executable by the one or more processors whereby the network node is adapted to
receive at a first service instance of the NF service producer a request message from an NF service consumer to update a resource;
select a second service instance of an NF service producer different than the first service instance to update the requested resource which is replicated in the second service instance; and
send a response message to the received request to the NF service consumer wherein the response message comprises a Uniform Resource Identifier, URI, for the updated resource together with information associated with the selected second service instance.

12. The Network node implementing the network function, NF, service producer of claim 11, wherein the NF Service producer is a Session Management Function, SMF, specified in the fifth generation Core network, 5GC.

13. A method of operation of a network node implementing a network function, NF, service consumer in a core network, comprising:
sending to a first service instance of an NF service producer a request message to create or update a resource;
receiving a response message comprising a Uniform Resource Identifier, URI, of the created or updated resource at a second service instance of the NF service producer and a service instance identifier identifying the second service instance, wherein the first service instance and the second service instance are different service instances; and
in response to receiving the response message and prior to sending or receiving any resource related message subsequent to the response message, associating the created or updated resource with the second service instance instead of the first service instance.

14. The method of claim 13 further comprising sending subsequent resource related messages to the second service instance of the NF service producer.

15. The method of claim 13, wherein the request and the response messages are based on hypertext transport protocol/REpresentational State Transfer, HTTP/REST.

16. The method of claim 13, wherein the response message further comprises information related to at least an overload information and a load information of the first service instance and/or the second service instance.

17. The method of claim 13, wherein the NF service producer of the first service instance and the NF service producer of the second service instance are each a Session Management Function, SMF, and the NF service consumer is an Access and Mobility Management Function, AMF, specified in the fifth generation Core network, 5GC.

* * * * *